United States Patent [19]

Sohm

[11] Patent Number: 4,793,861

[45] Date of Patent: Dec. 27, 1988

[54] GLASS REINFORCED COMPOSITIONS

[75] Inventor: Jean-Michel Sohm, Nancy, France

[73] Assignee: Vetrotex Saint-Gobain, Chambery, France

[21] Appl. No.: 70,481

[22] Filed: Jul. 7, 1987

[30] Foreign Application Priority Data

Jul. 10, 1986 [FR] France ............................... 86 10117

[51] Int. Cl.$^4$ ............................................ C04B 14/44
[52] U.S. Cl. ........................................ 106/99; 106/97; 106/98; 106/90
[58] Field of Search ........................ 106/99, 97, 98, 90

[56] References Cited

U.S. PATENT DOCUMENTS

| 3,852,082 | 12/1974 | Majumdar | 106/99 |
| 4,642,137 | 2/1987 | Heitzmann et al. | 106/84 |
| 4,687,752 | 8/1987 | Peters | 501/124 |

FOREIGN PATENT DOCUMENTS

| 2309943 | 8/1974 | Fed. Rep. of Germany . | |
| 1211265 | 3/1960 | France . | |
| 2149998 | 3/1973 | France . | |
| 847852 | 9/1960 | United Kingdom . | |
| 1113205 | 5/1968 | United Kingdom . | |
| 1314253 | 4/1973 | United Kingdom | 106/99 |
| 1588938 | 4/1981 | United Kingdom . | |
| 2148871 | 6/1985 | United Kingdom . | |

OTHER PUBLICATIONS

Chemical Abstracts, vol. 102, No. 20 (May, 1985), No. 171585Y.

Largent, "Estimation de l'activite Pouzzolanique," 93 Bull. Liaison Labo. P. et. Chem., 61, (Jan.-Feb. 1978).

British Standard Methods for Determining Properties of Glass Fiber Reinforced Cement Material (BS 6432: 1984).

*Primary Examiner*—Steven Capella
*Attorney, Agent, or Firm*—Pennie & Edmonds

[57] ABSTRACT

The invention relates to a cement-based product which is reinforced with glass fibers having good resistance to alkaline environments. The product of the invention contains, for each 100 parts by weight of cement, about 10 to 40 parts by weight of metakaolin, the latter exhibiting a reactivity to the modified Chapelle test greater than 500 mg of CaO per gram of metakaolin. The product of the invention has many uses in the building trade, particularly to produce facade coverings.

28 Claims, No Drawings

GLASS REINFORCED COMPOSITIONS

FIELD OF THE INVENTION

The invention relates to cement-based products containing alkaline resistant glass fibers. More particularly, it relates to stronger and more durable glass reinforced cement products having as an additive to the cement, a metakaolin copposition.

BACKGROUND OF THE INVENTION

The reinforcement of inorganic binders such as cement and concrete with glass fibers resistant to alkaline compounds is well known in the prior art. However, when these glass fibers are incorporated into binders of the type described above, a problem arises with regard to the strength and durability of the resultant binder-fiber composite. The composite product thus produced deteriorates over time, leading to a reduction in the breaking stress, i.e., the moduli of rupture, which seriously affects the durability of the product. The deterioration of the product is presaged by a sudden drop in the elongation in time, as well as in the energy required to rupture the fibers.

The degradation mechanism comprises a chemical attack upon the fibers by the alkaline interstitial solution within the cement, coupled with a physical manifestation wherein the cement-fiber interface is modified by the growth of crystals of $Ca(OH)_2$ and of hydrated silicates. This latter phenomenon dominates in the case of glasses which are resistant to alkalines. Because of the negative impact of such an attack on the durability of the product, the use of cement reinforced with glass fibers of the above-defined type is confined to nonstructural applications in the construction industry. In addition, considerable precautions are taken when such cement based products are utilized, e.g., by the use of flexible setting techniques and an attempt is made to take up the dimensional variations.

To eliminate these problems, more efficient glass compositions have been sought. $Ca(OH)_2$ is the principal enemy of glass fibers. In this regard, French Pat. No. 2,149,998 describes a product containing cement and glass fibers which are resistant to alkalines having certain defined characteristics. This product can attain a modulus of rupture of 24.5 MPa after a month under 60° C. hot water. To attain these values, a predetermined amount of a "pozzolan" is added to the cement matrix, the term pozzolan being defined in the patent as encompassing both artificial and natural materials which contain vitreous silicates that can react with lime.

However, this solution to the problem of glass degradation exhibits the following drawbacks:

the reference does not specify any composition for the pozzolans to be used. The experience of the applicant and the relevant literature both show that all pozzolans will not lead to an improvement in the strength of cements reinforced with alkali-resistant glass.

the reference discloses examples where the moduli of rupture and the impact strength of the composite, despite the addition of a pozzolan, diminish considerably over time.

For example, the modulus of rupture in the case of a mortar consisting of ordinary portland cement and 25% pozzolan of the fly ash type exceeds 29.46 MPa after 7 days but becomes lowered to 16.77 MPa after 30 days, including 23 days under water at 60° C.

SUMMARY OF THE INVENTION

The invention comprises a cement-based product, reinforced with glass fibers, that meets the requirements of the construction industry better than those previously known, particularly in that it makes it possible:

to obtain better immediate and long-term breaking strength values, to maintain the moduli of rupture and the impact strength of the product at approximately equal values which vary very little as these products are aged, i.e., wherein the product does not exhibit any substantial change in mechanical characteristics over time, according to the standard test in this field which is run under water at 50° C. for 3 months.

to lower the percentage of glass fibers needed to form a composite product having a given desired strength. The results obtainable with the present invention are more satisfactory than those obtained by prior art products, all other factors being equal.

It has therefore been determined that cement-based products reinforced with alkali-resistant glass fibers become almost insensitive to aging when 30 to 40 parts by weight of a metakaolin composition are added for each 100 parts of cement. It has also been observed that the characteristics of the cement-based product are clearly improved as soon as the amount of metakaolin exceeds 10 parts by weight of cement. By metakaolin or metakaolinite applicant means an activated product of kaolinite, produced thermally or by any other means. The formula of metakaolin can be written by using standard symbols used by cement manufacturers, $AS_2$ (wherein $A=Al_2O_3$ and $S=SiO_2$). It is obtained, for example, by heat treatment of kaolinite at temperatures varying between 700° and 900° C. for a period of several hours.

In addition to the excellent strengths obtained with the addition of the metakaolin composition to the glass fibers, the use of metakaolin also makes it possible:

to avoid the drawbacks posed by the use of ultrafine pozzolans whose grains can penetrate between the glass fibers. This promotes packing of the grains around the fibers, which causes them to become brittle, to prepare a homogeneous mixture of the cement based product with the metakaolin treated glass fiber in a manufacturing facility, which mixture may be employed at a construction work site in the place of a standard cement, to avoid the standard problems of supply related to the quantity and quality of the cement or concrete product normally encountered with the use of industrial by-products such as certain pozzolans, including silica fumes and fly ash, and to permit the manufacture and use of the composite product without the need to modify existing equipment. A production unit of glass reinforced concrete (GRC) can, for example, produce a product utilizing metakaolin almost without any special modification in its manufacturing equipment.

The invention therefore comprises a cement-based product of the above defined type, characterized in that its matrix contains about 10 parts to about 40 parts of metakaolin exhibiting a reactivity to the modified Chapelle test, described below, which is greater than 500 mg CaO per gram of metakaolin.

In an alternate embodiment of the invention, the product may contain between about 15 and 35 parts by weight of metakaolin, preferably between about 20 and 30 parts by weight and most preferably between about 21 and 23 parts by weight, in addition to the 100 parts by weight of cement.

In a further alternate embodiment of the invention, the alkali-resistant glass may contain a percentage of $ZrO_2$ which is preferably between about 14% and 20%, more preferably between about 15% and 17% and most preferably 16%.

The invention described herein includes a cement-based product reinforced with alkali-resistant glass fibers containing metakaolin, characterized in that the metakaolin in percentage by weight comprises:

$SiO_2$: 50% to 60%
$Al_2O_3$: 38% to 46%
CaO: less than 1%, and preferably less than 0.3%
$Na_2O$: less than 1%, and preferably between about 0.03% and 0.06%
$K_2O$: less than 1%, and preferably between about 0.25% and 0.65%
$Fe_2O_3$: 1% to 2%
MgO: 0.1% to 0.2% wherein the sum of the various percentages of the metakaolin constituent is less than 100%. The invention also advantageously proposes a product utilizing metakaolin which comprises, in percentage by weight, more particularly:

$SiO_2$: 56% to 59%
$Al_2O_3$: 38% to 41%
CaO: less than 0.1%
$Fe_2O_3$: 1.6% to 2%

The composition described above relates only to the "pure" metakaolin by itself, i.e., the active ingredient, to the exclusion of all other minerals, e.g., silica, microcline, lignite, iron oxide, etc. normally encountered in the presence of kaolinite.

An alternate embodiment of the invention described above is a product comprising metakaolin and silica fume in the following proportions for each 100 parts by weight of cement:

metakaolin: about 10 parts to about 30 parts by weight, and silica fume: about 5 parts to about 15 parts by weight, and more preferably:

metakaolin: about 12-17 parts by weight, most preferably about 15 parts by weight, and silica fume: about 8-12 parts by weight, most preferably about 10 parts by weight.

Silica fume may be defined as consisting of particles of silica having an average diameter on the order of 0.1 microns and having a specific surface area on the order of 20 $m^2/g$.

Another embodiment of the product according to the invention consists in adding between about 4% and 10%, preferably on the order of about 5%, of a polymer to the mixture to promote curing. This polymer may be, for example, an acrylic latex or a butadiene styrene.

DETAILED DESCRIPTION OF THE PREFERED EMBODIMENTS

The invention will be better understood upon a review of Tables I-V below, which provide additional details concerning the invention, and the explanations which follow.

Table I shows the composition of various mortars which were subjected to aging tests by the applicant. Some of the mortars are made according to the invention and others have compositions known in the prior art, so as to faciliate a comparison of the results obtained therewith. The mortars are numbered 1 to 16 and the figures appearing in the vertical columns are relative quantities in units of weight. For example, for 100 kg or parts of cement CPA55, 50 kg or parts of fine sand were used, etc. The quantity of glass fibers is expressed in percentage by weight of moist mortar. These glass fibers can either be incorporated into the cement by spraying or they may be previously added to the matrix.

Three types of metakaolins have been used in these tests and their compositions, expressed in percentages by weight, are given in Table II, wherein they are designated numbers 1, 2 and 4. However, additional metakaolins whose contents fall within the ranges described above would also be expected to give satisfactory results. An example is metakaolin No. 3 whose composition is also specified in Table II.

During the testing procedure a CPA55 standard portland cement was used, however, no particular type of cement is required to form the cement products reinforced with glass fibers (GRC) as described herein. The composition of the CPA cement is set forth in Table III. It is expressed by giving ranges in percentage of total weight, the sum of the various percentages being less than 100%.

The composition of the glasses which were used in the tests described in Table V are specified in Table IV. Generally, an alkali-resistant glass having more than 12% (by weight) $ZrO_2$, preferably more than 15%, and most preferably between 15.5 and 16.5% by weight $ZrO_2$ is perfectly suitable.

Additionally, Table V sets forth the moduli of rupture (measured in MPa by the bending test, which is well known to those of ordinary skill in the art) and certain elongations at rupture (in percentage of the initial length) according to various periods of aging under water at 50° C. for the mortars described in Table I.

The abbreviations used in Table V are MOR for the modulus of rupture and epsilon % for the elongation at rupture. The first aging period of 28 days was carried out at 20° C. and 50% relative humidity, while the later aging periods took place under water at 50° C. It should, however, be understood that when the aging test is accelerated by being carried out under water at 50° C., the values thus obtained correspond to an aging acceleration factor on the order of 100.

The modulus values are given at about plus or minus 2 MPa for the lowest values and about plus or minus 3 MPa for the highest values. The values of epsilon are given at plus or minus 0.1 to 0.2% for the values on the order of 1% and about plus or minus 0.05% for the values less than about 0.3%.

An examination of Tables I and V demonstrates that:

a mortar containing alkali-resistant glass fibers and 30 parts by weight of metakaolin No. 2 (whose composition is defined in Table II) for each 100 parts of cement, has its breaking strength characteristics practically unchanged over time (see, e.g., mortar No. 3 in Table I);

a mortar identical with the preceding one but which further contains 30 parts by weight of metakaolin No. 1, whose composition is defined by Table II, for each 100 parts of cement (see, e.g., mortar No. 6), has a breaking strength which decreases uniformly over time;

in the same manner, a comparison of the performance of mortar nos. 10, 11 and 13 clearly demonstrates the influence of the type of metakaolin used on the mechanical characteristics obtainable with the product.

The effect of varying the amount of metakaolin to be added is evident with regard to composition nos. 2, 3, 10 and 15, where it appears that 15 parts by weight of metakaolin for each 100 parts by weight of cement does not provide totally satisfactory mechanical characteristics. An examination of compositions 3 and 10 shows good stability for the mechanical characteristics over time, which therefore corresponds to an optimum content of the metakaolin. Composition no. 15 shows a swift decrease in the mechanical characteristics, which is attributable to the presence of an excessive amount of metakaolin.

The influence of the metakaolin/silica fume combination is demonstrated by the comparison of composition nos. 2, 7 and 9. This comparison demonstrates that the silica fume plays a positive role in the final product, without however being able to replace the metakaolin. This combination results in a very strong composite material with exceptional durability.

By comparing mortar No. 2 with mortar No. 1 (including a fly ash component) or mortar No. 12, which is the reference mortar containing alkali-resistant glass without any additives, the applicant notes that, with the addition of 15 parts by weight of metakaolin No. 2 for each 100 parts of cement (see, e.g., mortar No. 2), the aging of the composite product is very clearly slowed. That is to say that the modulus of rupture decreases by only a little more than 10% after 28 days plus 56 days of submergence water at 50° C., compared with a 40% lowering of this value which occurs with mortars no. 1 and no. 12;

The results obtained with cements reinforced with type E glass fibers, i.e., non alkali resistant, are clearly not as good as those obtained with glass fibers of the alkaliresistant type. Note, for example, the tests made on mortars no. 4 and 5. The test performed with only 4% glass fibers, i.e., in mortar No. 8 wherein 30 parts of metakaolin are added for each 100 parts of cement, show moduli of rupture that change very little over time, with good initial values at 28 days.

Therefore, all other factors being equal, an amount of glass fibers less than the glass fibers used in the prior art, can be used in the present invention to produce a product having a given desired strength. Levels of fibers approaching values between about 1.5% and 12%, and preferably between about 2.5% and 8%, most preferably 3%, make it possible to obtain products having very acceptable strengths and moduli of rupture.

The composite described herein may be prepared in a manner identical with standard glass reinforced concrete, which technique is well known by those of ordinary skill in the art. The replacement of ordinary cement with a cement reinforced with glass fibers, to which the metakaolin has been added is contemplated by the applicant as a prefered application of his invention. Nevertheless, applicant has determined that it is sometimes indicated, in order to overcome fluidity problems caused by putting the invention into practice, to incorporate a superliquefier composition in an amount of about 1-5 parts by weight and preferably between 1 and 2.5 parts by weight into the composition. This material may be of the naphthalenesulfonate type, as the comparison of tests 16 and 3 (Table I) demonstrates.

The preceding examples relate to compositions comprising 50 parts sand for each 100 parts of cement. Composition 14, however, shows that a different ratio of these materials, such as 150 parts sand for 100 parts cement, may also provide satisfactory results.

As discussed above, the addition to the composition of an acrylic latex or styrene-butadiene type polymer also makes it possible to obtain good results. For example, for a mortar comprising:

CPA (cement): 100 parts by weight
Fine Sand: 50 parts by weight
Water: 40 parts by weight
Metakaolin: 15 parts by weight
Liquefier: 1 parts by weight
Polymer (acrylic latex): 5 parts by weight
Level of fibers: 6% by weight in comparison with the mortar moduli of rupture measuring 30 MPa at 28 days and 24 MPa after 28 additional days under 50° C. hot water have been attained.

Generally, for each cement used, an attempt must be made to consume as much as possible of the lime present therein with the metakaolin. An appreciation of the pozzolanic activity of each addition therefore makes it possible, as a function of the lime ($Ca(OH)_2$) to be fixed, to more precisely meter the amount that must be added. This determination is evaluated according to the modified "Chapelle" test, as described by R. Largent in the Bulletin de Liaison des Laboratoires des Ponts et Chaussees [Bulletin of Bonding, Pub. by the Bridges and Roads Laboratories], No. 93, January–February 1978, pages 63 and 64. This test evaluates the amount of CaO (expressed in mg) potentially consumable by 1 gram of the pozzolan. For this purpose, the pozzolanic material is placed in contact with the lime in a water suspension for sixteen hours, at near boiling. After cooling, the amount of lime which has not reacted is ascertained.

Table II specifies the Chapelle reactivities of the various metakaolins tested. The reactivity of metakaolin nos. 2 and 4, in comparison with that obtained with metakaolin no. 1, explains the variations discussed previously with relation to Table V. Applicant believes that the optimum proportions have to be weighted as a function of the Chapelle reactivity of each of the metakaolins, i.e., the higher the reactivity, the smaller the necessary amount will be. For example, it has been determined that the inclusion of 22.5% of metakaolin No. 2 leads to characteristics much improved over those obtained with 30% of metakaolin No. 1, which is less reactive.

Applicant further notes that the considerable reactivity of the metakaolin makes it possible to quickly reach the suitable limits of proportionality (as defined in the standard BS 6432 of 1984). This brings about a considerable gain in productivity, for example, by reducing the time necessary for the mold release step, and thus makes it possible to reduce the dimensions and the amounts of materials used to produce a reinforced cement according to the invention.

Standard pozzolans of the fly ash type are much slower to react, which is not only harmful to the short-term properties of this material but also to the limit of proportionality which actually serves as a basis for the dimensioning of the cement-based products.

In addition, a product which is free of lime avoids the esthetic problems connected with the appearance of efflorescences. Moreover, it is additionally possible to use white metakaolins in combination with white cement, so that white products are made, in contrast with the majority of the other pozzolans which stain the mortar.

While it is apparent that the invention herein disclosed is well calculated to fulfill the desired results, it wil be appreciated that numerous modifications and embodiments may be devised by those skilled in the art, and it is intended that the appended claims cover all such modifications and embodiments as fall within the true spirit and scope of the present invention.

TABLE I

| Mortars No. | 1 | 2 | 3 | 4 | 5 | 6 | 7 | 8 |
|---|---|---|---|---|---|---|---|---|
| CPA55 (Cement) | 100 | 100 | 100 | 100 | 100 | 100 | 100 | 100 |
| Fine Sand | 50 | 50 | 50 | 50 | 50 | 50 | 50 | 50 |
| Water | 40 | 42 | 47 | 47 | 47 | 47 | 40 | 47 |
| Alkali Resistant Glass | 6% | 6% | 6% | — | — | 6% | 6% | 4% |
| E Glass | — | — | — | 6% | 6% | — | — | — |
| Fly Ash (Carbon combustion residue) | 10 | — | — | — | — | — | — | — |
| Silica fume | — | — | — | — | — | — | 10 | — |
| Mk 1 | — | — | — | — | 30 | 30 | 15 | 30 |
| Mk 2 | — | 15 | 30 | 30 | — | — | — | — |
| Mk 4 | — | — | — | — | — | — | — | — |
| Liquifier | 1 | 1.5 | 2.5 | 2.5 | 2.5 | 2.5 | 2.5 | 2.5 |

| Mortars No. | 9 | 10 | 11 | 12 | 13 | 14 | 15 | 16 |
|---|---|---|---|---|---|---|---|---|
| CPA55 (Cement) | 100 | 100 | 100 | 100 | 100 | 100 | 100 | 100 |
| Fine Sand | 50 | 50 | 50 | 50 | 50 | 150 | 50 | 50 |
| Water | 39.2 | 45 | 45 | 45 | 46.5 | 54 | 100 | 77 |
| Alkali Resistant Glass | — | 6% | 6% | 6% | 6% | 6% | 6% | 6% |
| E Glass | — | — | — | — | — | — | — | — |
| Fly Ash (Carbon combustion residue) | — | — | — | — | — | — | — | — |
| Silica fume | 17 | — | — | — | — | — | — | — |
| Mk 1 | — | — | 22.5 | — | — | — | — | — |
| Mk 2 | — | 22.5 | — | — | — | 22.5 | 100 | 30 |
| Mk 4 | — | — | — | — | 22.5 | — | — | — |
| Liquifier | 3.4 | 1.5 | 1.5 | — | 2 | 1.5 | 1 | 0 |

TABLE II

|  | Metakaolin No. 1 | Metakaolin No. 2 | Metakaolin No. 3 | Metakaolin No. 4 |
|---|---|---|---|---|
| $SiO_2$ | 53.52 | 57.60 | 51.64 | 54.3 |
| $Al_2O_3$ | 42.95 | 39.1 | 44.50 | 40.7 |
| CaO | 0.19 | <0.1 | <0.1 | <0.1 |
| $Fe_2O_3$ | 1.46 | 1.84 | 1.35 | 0.64 |
| $SO_3$ | 0.043 | — | — | 0.33 |
| MgO | 0.175 | 0.145 | 0.13 | 0.27 |
| $K_2O$ | 0.54 | 0.335 | 0.64 | 1.97 |
| $Na_2O$ | 0.04 | 0.032 | 0.055 | 0.056 |
| Modified Chapelle test reactivity (in mg CaO/g) | 592 | 750 | 750 | 837 |

TABLE III

|  | CaO | $SiO_2$ | $Al_2O_3$ | $Fe_2O_3$ | $SO_3$ | MgO | Alkali |
|---|---|---|---|---|---|---|---|
| CPA Cement | 60–77 | 17–25 | 3–8 | 0.5–6.0 | 1–3 | 0.1–4 | 0.2–1.3 |

TABLE IV

| Composition | Alkali-Resistant Glass | E Glass |
|---|---|---|
| $SiO_2$ | 70.27 | 54.50 |
| $Fe_2O_3$ | 0.05 | 0.27 |
| $TiO_2$ | 0.07 | 0.51 |
| $Al_2O_3$ | 0.24 | 14.22 |
| $ZrO_2$ | 16.05 | — |
| CaO | 0.04 | 17.32 |
| MgO | 0.04 | 4.71 |
| $Mn_2O_3$ | — | 0.01 |
| $Na_2O$ | 11.84 | 0.32 |
| $K_2O$ | 0.04 | 0.16 |
| $Li_2O$ | 1.04 | — |
| $SO_3$ | 0.02 | — |
| $B_2O_3$ | — | 7.94 |
| $As_2O_3$ | 0.04 | — |
| PbO | 0.03 | — |
| Total | 99.77 | 99.96 |

TABLE V

| Resistance | Mortars | | | | | | | |
|---|---|---|---|---|---|---|---|---|
|  | 1 | 2 | 3 | 4 | 5 | 6 | 7 | 8 |
| 28 days |  |  |  |  |  |  |  |  |
| MOR (MPa) | 31.2 | 26.9 | 32.7 | 27.3 | 34.0 | 29.8 | 38.2 | 25.9 |
| (ε %) | — | 1.1 | 1.3 | 0.9 | — | 1.3 | 1.2 | — |
| 28 days + 28 days in water at 50° C. |  |  |  |  |  |  |  |  |
| MOR (MPa) | 19.9 | 24.8 | 34.1 | 15.3 | 16.1 | 25.2 | 35.9 | 24.5 |
| (ε %) | — | 0.9 | 1.1 | 0.2 | — | 1 | 0.9 | — |
| 28 days + 56 days in water at 50° C. |  |  |  |  |  |  |  |  |
| MOR (MPa) | 18.8 | 23.8 | 32.8 | 13.4 | 13.9 | 26.4 | 34.9 | 23 |
| (ε %) | — | 0.8 | 1 | 0.1 | — | 1 | — | — |
| 28 days + 84 days in water at 50° C. |  |  |  |  |  |  |  |  |
| MOR (MPa) | 14.9 | 22.9 | 32.6 | 11.4 | 12.2 | 22.9 | 33.1 | 20.4 |
| (ε %) | — | 0.6 | 1 | 0.05 | — | — | — | — |

| Resistance | Mortars | | | | | | | |
|---|---|---|---|---|---|---|---|---|
|  | 9 | 10 | 11 | 12 | 13 | 14 | 15 | 16 |
| 28 days |  |  |  |  |  |  |  |  |
| MOR (MPa) | 34.4 | 31.6 | 31.5 | 34.4 | 34.0 | 34.7 | 13.3 | 18.1 |
| (ε %) | 1.3 | 1.1 | — | — | 1.3 | 1.24 | — | — |
| 28 days + 28 days in water at 50° C. |  |  |  |  |  |  |  |  |
| MOR (MPa) | 29.1 | 30.7 | 26.1 | 25.8 | 32.7 | 32.5 | 10.3 | 19.6 |
| (ε %) | 0.8 | 0.85 | — | — | 1.02 | 0.94 | — | — |
| 28 days + 56 days in water at 50° C. |  |  |  |  |  |  |  |  |
| MOR (MPa) | 25.2 | 30.2 | 21 | 21.8 | 31.9 | 33.6 | 10.5 | 16.9 |
| (ε %) | 0.6 | — | — | — | 0.96 | 0.94 | — | — |
| 28 days + 84 days in water at 50° C. |  |  |  |  |  |  |  |  |
| MOR (MPa) | 24.1 | 29.9 | 19.3 | 17.8 | 27.8 | 29.7 | 10.5 | 20.9 |
| (ε %) | 0.4 | — | — | — | 0.77 | 0.68 | — | — |

I claim:
1. A reinforced composition consisting essentially of:
   100 parts by weight of a cementitious composition;
   from about 10–40 parts by weight of a metakaolin additive; and
   from about 1–12 parts by weight of an alkali resistant glass.

2. The composition of claim 1 wherein said metakaolin additive exhibits a value with a modified Chapelle test greater than 500 mg CaO per gram of said metakaolin.

3. The composition of claim 1 wherein said metakaolin additive comprises:
   $SiO_2$: from about 50-60 parts by weight,
   $Al_2O_3$: from about 38-46 parts by weight,
   CaO: less than 1 part by weight,
   $Na_2O$: less than 1 part by weight,
   $K_2O$: less than 1 part by weight,
   $Fe_2O_3$: from about 1-2 parts by weight, and
   MgO: from about 0.1 to 0.2 parts by weight.

4. The composition of claim 1 wherein said alkali resistant glass comprises from about 10 to 20 parts by weight of $ZrO_2$ per 100 parts by weight of said glass.

5. A reinforced composition consisting essentially of:
   100 parts by weight of a cementitious composition;
   from about 10 to about 30 parts by weight of a metakaolin additive;
   from about 5 to about 15 parts by weight of a silica fume; and
   from about 4 to about 10 parts by weight of a polymer to promote curing of the composition.

6. The composition of claim 1, wherein said polymer is an acrylic latex or a styrene-butadiene polymer.

7. A reinforced composition comprising
   100 parts by weight of a cementitious composition;
   from about 1-12 parts by weight of an alkali-resistant glass; and
   from about 10-40 parts by weight of a metakaolin additive to prevent a chemical attack upon said alkali-resistant glass by an alkaline interstitial solution formed within said cementitious composition.

8. The composition of claim 7 wherein the metakaolin additive exhibits a value with a modified Chapelle test greater than 500 mg CaO per gram of said metakaolin.

9. The composition of claim 8 wherein said metakaolin is present in an amount of from about 15 to about 35 parts by weight.

10. The composition of claim 9 wherein said metakaolin is present in an amount of from about 20 to about 30 parts by weight.

11. The composition of claim 7 wherein said metakaolin additive comprises:
   $SiO_2$: from about 50-60 parts by weight,
   $Al_2O_3$: from about 38-46 parts by weight,
   CaO: less than 1 part by weight,
   $Na_2O$: less than 1 part by weight,
   $K_2O$: less than 1 part by weight,
   $Fe_2O_3$: from about 1-2 parts by weight, and
   MgO: from about 0.1 to 0.2 parts by weight.

12. The composition of claim 11 wherein said metakaolin additive comprises:
   $SiO_2$: from about 56-59 parts by weight,
   $Al_2O_3$: from about 38-41 parts by weight,
   CaO: less than 0.1 part by weight, and
   $Fe_2O_3$: from about 1 to 2 parts by weight.

13. The composition of claim 7 wherein said alkali resistant glass comprises from about 14 to 20 parts by weight of $ZrO_2$ per 100 parts by weight of said glass.

14. The composition of claim 13 wherein said $ZrO_2$ is present in an amount of from about 15 to about 17 parts by weight.

15. The composition of claim 7 or 13 wherein said alkali resistant glass is present in an amount of from about 5 to about 8 parts by weight.

16. The composition of claim 7 wherein said cementious composition is a portland cement.

17. A glass fiber reinforced composition which comprises:
   100 parts by weight of a portland cement;
   from about 5-8 parts by weight of an alkali-resistant glass, said glass comprising from about 14-20 parts by weight of $ZrO_2$ per 100 parts of said glass; and
   from about 20-30 parts by weight of a metakaolin additive to prevent a chemical attack upon said alkali-resistant glass by an alkaline interstitial solution formed within said portland cement, wherein said metakaolin exhibits a value with a modified Chapelle test greater than 500 mg CaO per gram of metakaolin and further wherein said metakaolin additive comprises:
   $SiO_2$: from about 50-60 parts by weight,
   $Al_2O_3$: from about 38-46 parts by weight,
   CaO: less than 1 part by weight,
   $Na_2O$: less than 1 part by weight,
   $K_2O$: less than 1 part by weight,
   $Fe_2O_3$: about from 1-2 parts by weight, and
   MgO: from about 0.1 to 0.2 by weight.

18. A reinforced composition comprising:
   100 parts by weight of a portland cement;
   from about 5 to 15 parts by weight of a silica fume; and
   from about 10 to about 30 parts by weight of a metakaolin additive to prevent a chemical attack upon said silica fume by an alkaline interstitial solution formed within said cementitious composition.

19. The composition of claim 18 wherein the metakaolin additive exhibits a value with a modified Chapelle test greater than 500 mg CaO per gram of said metakaolin.

20. The composition of claim 18 wherein said metakaolin additive is present in an amount of about 12-17 parts by weight.

21. The composition of claim 18 wherein said silica fume is present in an amount of 8-12 parts by weight.

22. The composition of one of claims 7, 17 or 18 which further comprises from about 1 to about 5 parts by weight of a superliquifier component to overcome fluidity problems within said composition by the liquid/cement ratio therein.

23. The composition of claim 22 wherein said superliquifier is a napthalene-sulfonate composition.

24. The composition of one of claims 7, 17 or 18 which further comprises from about 4 to about 10 parts by weight of a polymer to promote curing of the composition.

25. The composition of claim 24, wherein said polymer is an acrylic latex or a styrene-butadiene polymer.

26. The composition of claim 24, wherein said polymer is present in an amount of from about 4 to about 6 parts by weight.

27. A reinforced composition which comprises 100 parts by weight of a cementitious composition and from about 1 to about 12 parts by weight of an alkali resistant glass, wherein the improvement comprises adding to said composition an amount of from about 10 to about 40 parts by weight of a metakaolin composition in order to prevent a deterioration over time of the modulus of rupture and impact strength of a glass-reinforced cement composite product produced therewith and to prevent a chemical attack upon said alkali resistant glass by an alkaline interstitial solution formed within said cementitious composition.

28. A reinforced composition comprising:
100 parts by weight of a portland cement;
from about 8 to about 12 parts by weight of a silica fume;
from about 12 to about 17 parts by weight of a metakaolin additive to prevent a chemical attack upon said silica fume by an alkaline interstitial solution formed within said portland cement; and
from about 4 to about 6 parts by weight of an acrylic latex or a styrene-butadiene polymer.

* * * * *